June 8, 1965  J. F. PEYTON ETAL  3,187,778
DUCT INSULATION
Filed Aug. 20, 1959
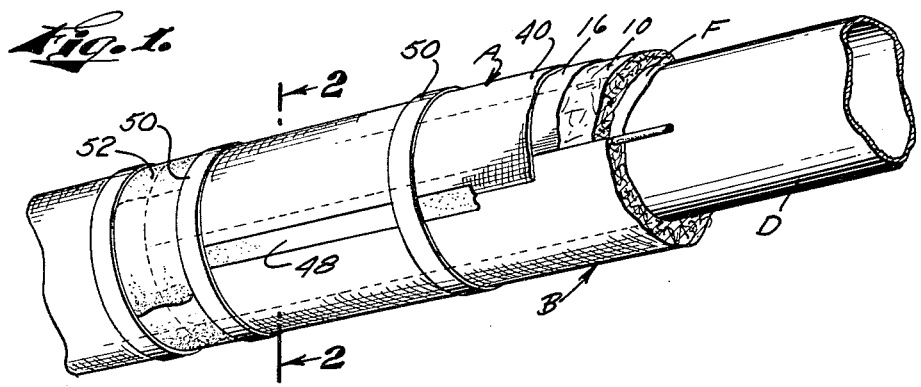
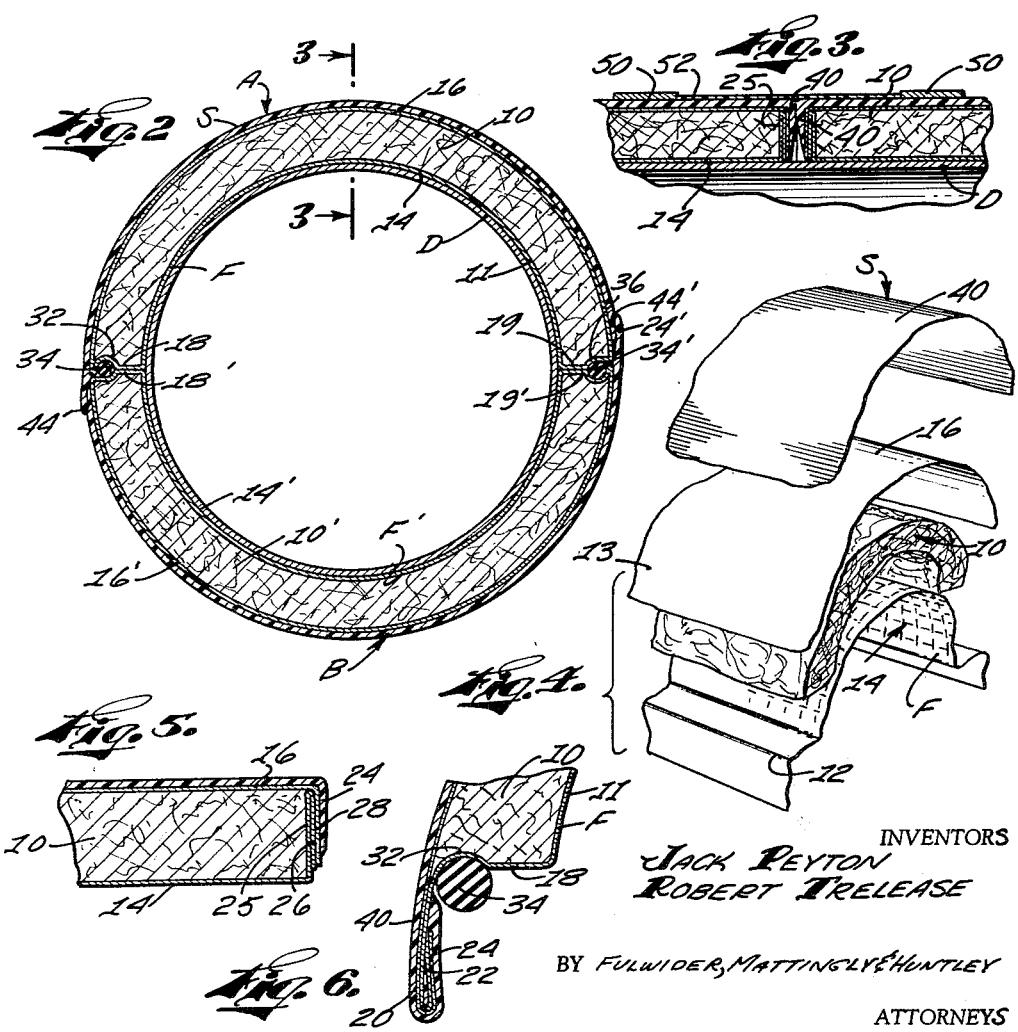
INVENTORS
JACK PEYTON
ROBERT TRELEASE
BY FULWIDER, MATTINGLY & HUNTLEY
ATTORNEYS 3,187,778
DUCT INSULATION
John F. Peyton, Inglewood, and Robert B. Trelease, Los Angeles, Calif., assignors to Federal-Mogul-Bower Bearings, Inc., Detroit, Mich., a corporation of Michigan
Filed Aug. 20, 1959, Ser. No. 834,968
2 Claims. (Cl. 138—143)

This invention relates generally to duct insulation and more particularly to light-weight insulation for use in blanketing high-temperature aircraft ducting systems.

The blanketing of hot air bleed ducting in aircraft has presented many problems. It is primarily essential that aircraft duct insulation be light in weight and at the same time retain duct heat and keep the outer shell temperature to the point where drippage of fuels and other combustibles will not present a fire hazard. The light-weight insulation package cannot be subject to fracture or rupture upon impact blows because the fractured areas are a possible source of dangerous wicking of combustible fluids. The relatively thin insulation must be tough and durable to permit handling without denting and loss of insulation thickness, since thickness is the most important factor in controlling insulation efficiency and can be unavoidably decreased in light weight blankets, thus lowering efficiency and raising surface temperature. This is true since most conventional high temperature insulation blankets are formed of metal foil covered fibrous glass, asbestos, or mineral wool and take a permanent set in thickness when the surface is compressed. Standard aircraft hot air ducting insulation has heretofore lacked the ruggedness and stiffness that is necessary to prevent loss of integrity, damage from mis-handling and at the same time providing proper insulation without sacrifice of weight.

One of the main objects of the present invention is to provide a stiff durable duct insulation that seals and protects the fibrous glass insulation batting.

Another object of the invention is to provide a light-weight rugged duct insulation that permits handling without danger of fracture and loss of insulation by compression or denting.

Still another object of the invention is to provide an arrangement of insulation batting that is sealed by a relatively thin metal foil and has a reinforced outer surface that is durable, protective and heat resistant.

A further object of the invention resides in duct insulations having elements associated in a manner to protect against rupturing impacts that could result in dangerous wicking of the insulation by combustible fluids.

A still further object of the invention is in a unique method of assembling duct insulation about a duct.

Yet another object of the invention is in the provision of duct insulation that lends itself to either demountable application permitting duct inspection or as a permanent insulating element.

With the foregoing objects in view, and such other objects and inventions as will become apparent to those skilled in the art to which this invention relates as this specification proceeds, the invention consists essentially in the arrangement and construction of parts all as hereinafter more particularly described, reference being had to the accompanying drawing in which:

FIGURE 1 is a partially broken-away perspective view of a preferred form of duct insulation embodying the present invention, such insulation being applied to a heated duct;

FIGURE 2 is a vertical sectional view in enlarged scale taken on the line 2—2 of FIGURE 1;

FIGURE 3 is a fragmentary vertical sectional view taken on the line 3—3 of FIGURE 2;

FIGURE 4 is an exploded perspective view showing the various elements of the insulation;

FIGURE 5 is a fragmentary sectional view showing the manner of sealing the end of the insulation batting and attaching the stiff outer coating of said duct insulation; and FIGURE 6 is a vertical perspective view in further enlarged scale showing a detail of said insulation.

Referring to the drawing and particularly to FIGURE 2 thereof, a standard aircraft bleed duct is shown at D. The drawing discloses a preferred form or embodiment of the invention wherein the duct insulation is constructed for demountable attachment on the ducting D. It is contemplated that in some instances the novel duct insulation of the present invention will be applied permanently to high temperature aircraft ducts and such arrangement of parts and process is described hereinafter.

As shown clearly in FIGURE 2 of the drawing, two identical insulation sections A and B are adapted to completely encircle and seal the duct D. Accordingly, it is necessary that only one of the sections A be described, while elements in section B similar to those of section A bear primed reference numerals. This section A includes a semi-circular pad of heat insulating batting 10. Preferably this batting will be of fibrous glass, as for example, the product sold under the name Fiberglas by Owens Corning. The batting 10 has a thin sheet of metal such as stainless steel foil F completely enveloping it on the sides and ends thereof. The gage of the foil 11 is reduced as compared to the gage normally employed in duct insulation of this general nature, but this foil 11 is sufficiently strong to closely embrace, contain and seal the enclosed batting 10. Preferably, a single sheet of foil F completely encloses the batting 10. Referring particularly to FIGURE 2, such foil sheet F defines a generally semi-circular inner wall 14, a similarly configured outer wall 16 of larger diameter and radially extending webs 18 and 19 that abut the complementary web 18' and 19' of the section B. The major portion of the wall 11 or 16 may be of textured or waffled surface if additional stiffness or forming ease are required.

The longitudinal edge portions 20 and 22 of the foil are affixed together as by welding, soldering, bonding or other suitable means in a conventional manner, as shown in FIGURE 6. Moreover, these edge portions 20 and 22 cooperate to define the rigidifying means for a closure flap 24 that depends from the radially outer wall 16, the lower edge of the edge portions 20 and 22 being overlapped upwardly against the radially inwardly-facing surface of the edge portion 22.

The ends of the batting 10 are sealed by the ends of the foil sheet F, in the manner best shown in FIGURES 3, 4 and 5, and referring thereto, the end 25 of the radially inner wall 14 of the foil sheet F is bent back on itself to form a stiffener 26. The adjacent end 28 of the radially outer wall 16 of the foil sheet F is then brought down in overlapping relationship with the stiffener 26. The foil elements 25, 26 and 28 are united as by welding, soldering, bonding or other suitable means. Various other manners of sealing the batting within the foil sheet F may be varied without departing from the scope and spirit of the present invention.

As indicated in FIGURE 2, the radially outer portion of the web 18 is formed with an upwardly extending semi-circular groove 32. This groove 32 receives a longitudinally extending sealing strip 34. Such sealing strip 34 is formed of a heat resistant, resilient material, as for example a suitable synthetic rubber. The strip 34 is preferably bonded as by gluing within the groove 32. The opposite web 19 likewise may be formed with a similar groove 36 for receiving the sealing strip 34′ of the section B.

The sealing strip and groove may not be required if other sealing means are used or if a high degree of sealing is not desired.

In addition, the sections may be joined in other configurations such as butt or wedge either with or without additional sealing means.

The external surface of the outer wall 16 is covered by a stiff shell S of synthetic plastic impregnated textile material 40. Such shell S may be formed of at least a single layer of fibrous glass or asbestos that is impregnated with a suitable high temperature resin such as phenolic. Referring to FIGURE 6, it should be particularly noted that the material 40 is brought down around and then up over the raw edges of the foil sheet edge portions 20 and 22. Similarly, as shown in FIGURE 3, the ends of the material 40 are brought radially inwardly over the raw edges of the foil ends.

In assembling the aforedescribed duct insulation, preferably the foil sheet F is first wrapped about the batting 10 and the edges of the sheet affixed together. The layer 40 is then placed upon the outer wall 16 and wrapped about the raw edges of the foil. The assembly is then cured while pressure is applied to bond the plastic impregnated shell S to the foil F in a conventional manner.

In assembling a plurality of the aforedescribed sections A and B on a ducting D, the sealing strips 34 and 34′ are sealingly received by the grooves 36 and 36′. Additionally, the flaps 24 and 24′ sealingly overlap the adjacent underlying portions 44 and 44′ of the respective sections. It is preferable that the longitudinal joint between the ends of the flaps 24 and 24′ be positively sealed by means of tape 48, as for example a heat, moisture and fuel resistant pressure-sensitive tape.

The sections A and B are suitably removably retained in place on the ducting D as by means of conventional band or strap members 50. Prior to the application of such strap members 50, a length of tape 52 or the like is wrapped about the sections A and B so as to completely seal the joint between the adjoining ends of these sections. This tape may be similar to the aforedescribed tape 48. The insulation sections may be readily removed from the ducting D for inspection.

With the aforedescribed arrangement the batting 10 is positively enclosed whereby wicking of combustibles is avoided. The bonding of the outer wall 16 of the foil F to the shell S prevents fracture of the plastic impregnated layer 40 by impact blows. This is important since such damage can result in wicking of the combustibles. The shell S is extremely resistant to puncturing and denting, while the foil F alone is readily subject to such damage. Thus, by combining the foil F and the shell S there is provided an outer cover having the tensile properties and barrier advantage of steel with the stiffness of a synthetic plastic sheet and with such cover being of a minimum weight. Moreover, since the foil F is resilient by reason of the presence of the shell S it will spring back when inadvertently depressed rather than taking a permanent set. Accordingly, thickness of the batting 10 will always be maintained. In this manner local "hot spots" and the accompanying dangers inherent thereto are avoided. Another safety feature results from the fact that the plastic impregnated shell S is cooler to the touch than conventional steel insulation.

The novel duct insulation heretofore described may be also applied as permanent or "integral" insulation. In this regard, the sections A and B need not be fashioned as two halves, but instead may completely surround the ducting D. In either case, by utilizing the tensile property and barrier advantage of steel foil and rigidizing same with the stiffness of a phenolic impregnated fibrous glass layer, a permanent or demountable aircraft ducting is provided that is rugged, durable and having a steel cover sufficiently flexible that it will return to normal configuration if inadvertently depressed. The construction of this ducting permits wide variations of end configurations, shapes and form, all determined by the metal tooling. The embodiment herein disclosed and described may be considered a typical example.

Since various modifications can be made in our invention as hereinabove described, and many apparently widely different embodiments made within the spirit and scope of the claims without departing from such spirit and scope, it is intended that all matter contained in the accompanying specification shall be interpreted as illustrative only and not in a limiting sense.

We claim:

1. Duct insulation, comprising: a pair of complementary, generally semi-circular sections, each including a generally semi-circular pad of heat insulating batting, a cover of metallic foil sheet material sealingly enveloping said pad, said sheet being configured to define a generally semi-circular inner wall, a similarly configured outer wall of larger diameter and a pair of radially extending webs that interconnect the ends of said walls, and a generally semi-circular stiff shell of synthetic plastic impregnated textile material bonded to the external surface of said outer wall; a generally circumferentially extending closure flap extending from one side of each section to overlap the opposite side of the other section, said closure flap being defined by said metallic foil sheet material and being covered by said shell; means for removably securing said sections in encircling relationship upon said duct; and means for sealing the joints between adjoining elements of said sections, including elongated cylindrically shaped resilient sealing members interposed between the abutting webs of said sections and extending longitudinally thereof, said abutting webs being formed to sealingly engage said resilient member to thereby seal the joints between said sections.

2. Duct insulation, comprising: a pair of complementary, generally semi-circular sections, each including a generally semi-circular pad of heat insulating batting, a cover of metallic foil sheet material sealingly enveloping said pad, said sheet being configured to define a generally semi-circular inner wall, a similarly configured outer wall of larger diameter and a pair of radially extending webs that interconnect the ends of said walls, and a generally semi-circular stiff shell of synthetic plastic impregnated textile material bonded to the external surface of said outer wall; a generally circumferentially extending closure flap extending from one side of each section to overlap the opposite side of the other section, said closure flap being defined by said metallic foil sheet material and being covered by said shell; means for removably securing said sections in encircling relationship upon said duct; and means for sealing the joints between adjoining elements of said sections, including elongated cylindrically shaped resilient sealing members interposed between the abutting webs of said sections and extending longitudinally thereof, each of said abutting webs being formed with a semi-circular concave surface for sealing engaging one half of said resilient members, said sections being positioned to effect alignment of the concave surfaces of said abutting webs for sealing engagement with said cylindrical sealing member to thereby seal the joints between said sections.

(References on following page)

References Cited by the Examiner

UNITED STATES PATENTS

| | | | |
|---|---|---|---|
| 1,921,648 | 8/33 | Baumeister | 154—45 |
| 2,129,865 | 9/38 | Newport et al. | 154—44 |
| 2,181,074 | 11/39 | Scott | 154—44 T |
| 2,561,891 | 7/51 | Tucker. | |
| 2,613,166 | 10/52 | Gronemeyer | 154—45 |
| 2,671,492 | 3/54 | Biordi et al. | 154—44 |
| 2,705,208 | 3/55 | Schweikert | 154—44 |
| 2,723,705 | 11/55 | Collins | 154—28 |
| 2,742,115 | 4/56 | Strong | 154—45 |
| 2,828,798 | 4/58 | Hopkins et al. | 154—44 |
| 2,962,402 | 11/60 | Sweeney | 154—44 |

OTHER REFERENCES

"Heating, Piping and Air Conditioning," pages 136–39 cited, July 1958, TH 7201 H 54.

"Oil and Gas," pages 131–134 cited, February 10, 1958, TN 860.039.

EARL M. BERGERT, *Primary Examiner.*